(12) United States Patent
Lester

(10) Patent No.: US 6,616,397 B1
(45) Date of Patent: Sep. 9, 2003

(54) HOIST SYSTEM AND METHOD OF USE

(76) Inventor: Jimmie G. Lester, 260 W. Washington St., Martinsville, IN (US) 46151

( * ) Notice: Subject to any disclaimer, the term of this patent is extended or adjusted under 35 U.S.C. 154(b) by 0 days.

(21) Appl. No.: 10/094,002

(22) Filed: Mar. 11, 2002

(51) Int. Cl.[7] ............................................... B66C 23/44
(52) U.S. Cl. ....................... 414/540; 414/462; 212/177; 212/180; 212/294
(58) Field of Search .................. 414/462, 540; 212/294, 299, 180, 177

(56) References Cited

U.S. PATENT DOCUMENTS

| | | | | |
|---|---|---|---|---|
| 1,598,897 A | * | 9/1926 | Tirrell | 212/180 |
| 3,593,865 A | * | 7/1971 | Moor et al. | 280/402 XL |
| 4,782,962 A | * | 11/1988 | Hackworth et al. | 212/195 |
| 4,806,063 A | * | 2/1989 | York | 414/462 |
| 4,872,581 A | * | 10/1989 | Wedhorn | 212/180 |
| 5,419,672 A | * | 5/1995 | Poe | 414/540 |
| 5,971,177 A | * | 10/1999 | Carter | 212/177 |
| 6,460,908 B1 | * | 10/2002 | Green | 293/117 |

* cited by examiner

*Primary Examiner*—Steven A. Bratlie
(74) *Attorney, Agent, or Firm*—Daniel O'Connor

(57) ABSTRACT

A portable hoist system and method of use in combination with the rear bed and ball hitch of a pick-up truck. All of the system components may be contained in a portable bag about four feet long. The system components include plural boom sections, plural cables or support lines and a chain element. Two of the boom sections contain eyelets for support and lift purposes. The top side walls of the pick-up truck bed include eyelets for upward support of the boom sections.

1 Claim, 2 Drawing Sheets

HOIST SYSTEM AND METHOD OF USE

BACKGROUND AND OBJECTS OF THE INVENTION.

The present invention is generally related to the hoist arts and, in particular, to a novel system and method for adapting a hoist system to the back of a truck.

The use of truck-mounted hoists has been shown in the prior art. However, such prior art systems have proven to be cumbersome to install and difficult to use in practice. Prior art systems have also proven to be overly expensive and have thus not found widespread use in the art.

Accordingly, it is an object of the present invention to demonstrate a novel hoist system which may be easily adapted for use on the back of a pick-up truck.

It is a still further object of the invention to show a hoist method which is very easy to use in practice and which may be installed and used by a single person.

It is also an object of the invention to set forth a hoist system and method which may be economically mass-produced for widespread commercial appeal.

These and other objects and advantages of the invention will be apparent to those of skill in art from the description which follows.

PRIOR ART PATENTS AND DESIGNS

During the course-of preparing this Patent Application for submission to the U.S. Patent and Trademark Office, a full search of the prior art was conducted.

U.S. Pat. No. 5,281,078 shows a portable hoist which is attached to the rear bed of a pick-up truck. The design is attached to a hitch at a central location of the truck bed. This particular design is costly to manufacture and install and thus has not found widespread use in the art.

In contrast, the present invention has components which are economically manufactured and easily installed. It utilizes an existing rear bumper trailer hitch to minimize the number of parts required.

Accordingly, the present system is believed to be clearly patentable over all known hoist systems in the prior art.

SUMMARY OF THE INVENTION

An elongated boom element is securely and movably attached to a trailer hitch on a rear bumper of a pick-up truck.

A pulley and chain assembly is attached to one end or remote location of the boom element and serves to lift a desired load.

Plural support cables serve to lift and support the boom. The support cables extend from one remote location on the boom to various portions of the truck bed and/or sidewalls.

The boom and support cables may be adjustable by known mechanical means to provide various heights and angles for the overall hoist assembly.

The movable parts of the design may be easily controlled, for example, via a hand winch element.

BRIEF DESCRIPTION OF THE DRAWING FIGURES

Figure 3:
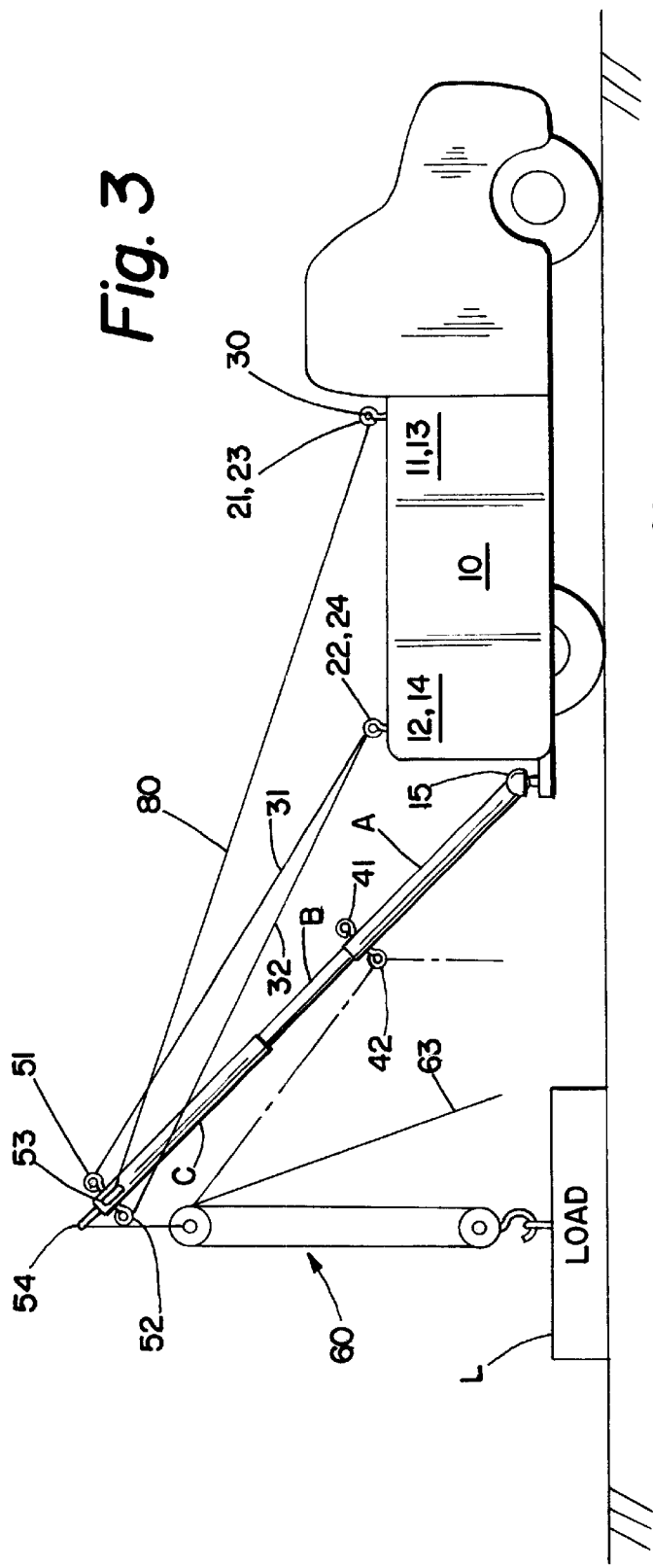

FIG. 3 is a side view of the combined truck bed, boom system and load-lifting pulley 60 in a raised position. The elongated cable 80 is attached to chain 30 and cable 32 is attached to eyelet 22. Load L is shown in a raised position.

Figure 4:
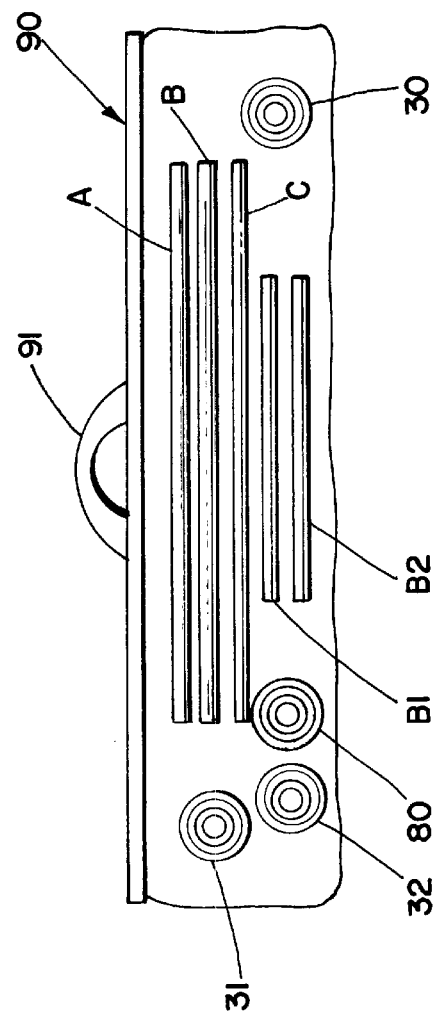

FIG. 4 is a view of the kit form of the invention and illustrates how the various components can be broken down and carried in a relatively small bag.

FULL DESCRIPTION OF A PREFERRED EMBODIMENT

Figure 1:
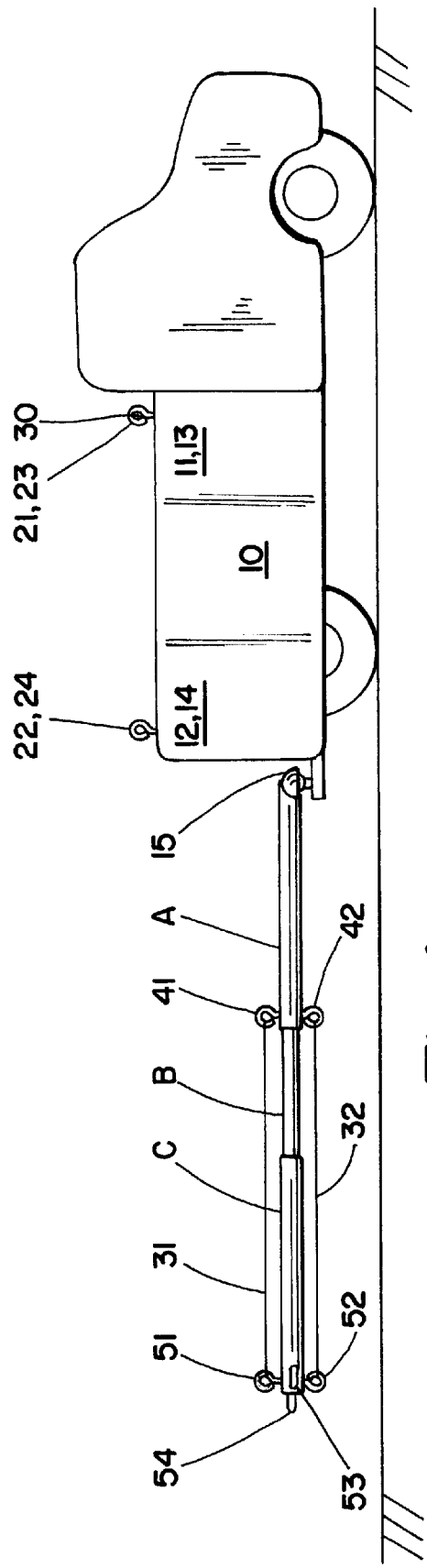
FIG. 1 is a side view of the combined truck bed and boom system. The boom elements A, B, and C in an on-ground position.
Figure 2:
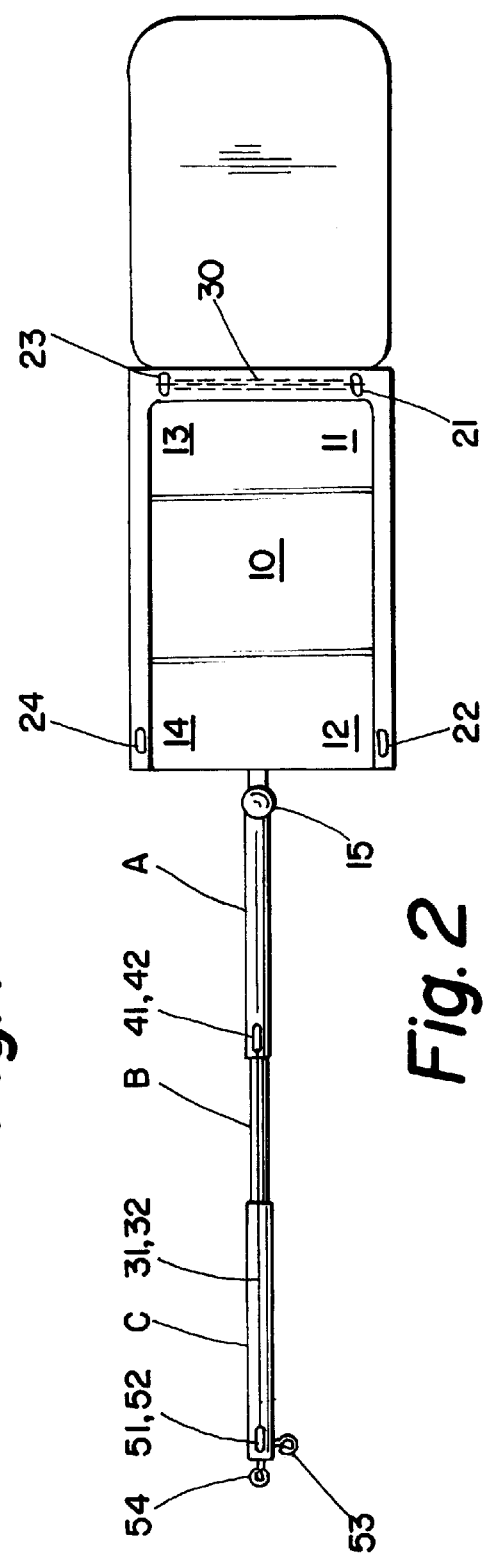
FIG. 2 is a top view of the combined truck bed and boom system also in an on-ground position. The position of eyelets 21–24 is indicated on the top walls of the truck bed.

Referring to the drawing FIGS. 1 and 2, a pick-up truck bed 10 is indicated schematically as having corner sections 11, 12, 13 and 14.

Each of the respective corner sections has an eyelet 21, 22, 23 and 24 mounted at an upper portion thereof. A chain element 30 extends between eyelets 21 and 23 for purposes to be described.

A standard 2-inch ball trailer hitch 15 is further shown in FIG. 1. In the lowered, on-ground position of the boom/hoist combination, boom section A is attached to the trailer hitch 15. Boom section A has eyelets 41 and 42 formed therein for reasons to be further described.

A boom extension section B is snug-fit into boom section A. It is noted that plural boom extensions B1 and B2 may be added to the system depending upon the length desired.

While still in the on-ground position, a final boom section C is added to the boom via a snug-fit connection.

The top boom section C has plural eyelets formed thereon as indicated at numerals 51, 52, 53 and 54 of FIGS. 1 and 2.

To further continue the on-ground setup operation, a cable 31 is extended between eyelets 51 and 41. Further, a cable 32 is extended between eyelets 52 and 42.

While still in the on-ground position, a chain and-pulley type hoist 60, or equivalent, is attached to the boom section C by means of an eyelet 54. Further, an elongated support cable 80 is attached to an eyelet 53 at the upper end of boom section C.

Elongated cable 80 is indicated in FIG. 3 as extending from the upper boom section C to the chain 30 in the bed of the pick-up truck.

The combined boom sections and hoist are now ready to be raised to an upper load-carrying position.

To accomplish this, the boom sections are easily manually raised to an upper desired position and the following steps are performed:

1) cable 31 is removed from eyelet 41 and placed into eyelet 24 at the back end of the truck side wall,
2) cable 32 is removed from eyelet 42 and placed into eyelet 22 also at the back end of the truck bed.

The boom and hoist combination is thus placed into the raised position shown in FIG. 3.

The elongated cable 80 is then extended to the chain 30 to provide further central support for the boom and hoist combination.

The system is now ready to pick up a load L and the chain and pulley hoist is attached to the load L. In a manner known in the art, the load L is raised by pulling on a rope 63 and such rope may be tied around eyelets 41 and 42 to retain and secure the rope.

In the manner described, a heavy load L may be easily transported from one place to another in a one-man operation which may be easily and quickly performed.

FIG. 4 illustrates the portable kit nature of the invention.

A bag 90 of only about four feet in length contains boom section A, B and C and also further boom sections B1 and B2. The bag 90 also contains the various supporting strap, line and chain elements.

The breakdown ability of the system into a small kit form is considered an important aspect of the design since it enables a fuller use of the truck bed.

While a particular design system and method have been described herein, it is intended in this specification to broadly cover all equivalent systems-and methods which would reasonably occur to those of skill in the art.

I claim:

1. A hoist system in combination with the bed(10) of a pick-up truck, said truck bed having corner areas(11,12,13, 14) and eyelets(21,22,23,24) mounted at the tops of said corner areas, said truck bed including a ball hitch(15) mounted at the rear thereof, a first boom section(A) mounted to the ball hitch(15), a boom extension section(B) attached to said first boom section(A), an end boom section(C) attached to said boom extension section(B), a chain(30) extending between forward eyelets (21,23) of said truck bed, plural cable means(31,32,80) extending from said end boom section(C) for supporting said attached boom sections(A,B,C) in an elevated position, wherein two of the cable means(31,32) extend from the end boom section(C) to eyelets(24,22) at a rear portion of said truck bed(10), and wherein one of the cable means(80) extends from the end boom section(C) to the chain(30), wherein said end boom section(C) includes four eyelet means(51,52,53,54), wherein two of said cable means(31,32) are attached to respective eyelets(51,52) of said end boom section(C), and wherein a third cable means(80) is attached to an eyelet(53) of said end boom section(C), wherein a hoist or pulley(60) is attached to a fourth eyelet(54) of said end boom section(C), wherein said first boom section(A) has eyelet means(41, 42) formed at the end thereof for initially receiving the cables(31,32) when the combined boom sections(A,B, C) are in a lower or on-ground position, wherein the arrangement of the hoist system enables a single person to lift the hoist boom sections(A,B,C) to a desired height, wherein a single person is able to remove a first cable(31) from a first eyelet(41) on the first boom section(A) and to attach the first cable(31) to an eyelet(24) on the truck bed and further to remove a second cable(32) from a second eyelet(42) on the first boom section(A) and to attach the second cable(32) to an eyelet(22) on the truck bed.

* * * * *